(12) United States Patent
Fang

(10) Patent No.: US 10,750,900 B2
(45) Date of Patent: Aug. 25, 2020

(54) NOZZLE-MOVING DEVICE

(71) Applicant: Huashuay Enterprise Co., Ltd., Keelung (TW)

(72) Inventor: Chih-Ping Fang, Keelung (TW)

(73) Assignee: HUASHUAY ENTERPRISE CO., LTD., Keelung (TW)

( * ) Notice: Subject to any disclaimer, the term of this patent is extended or adjusted under 35 U.S.C. 154(b) by 333 days.

(21) Appl. No.: 15/996,886

(22) Filed: Jun. 4, 2018

(65) Prior Publication Data

US 2019/0365143 A1    Dec. 5, 2019

(51) Int. Cl.
*A47J 31/46* (2006.01)
*A47J 31/44* (2006.01)
*A47J 31/00* (2006.01)
*A23P 30/20* (2016.01)

(52) U.S. Cl.
CPC ............ *A47J 31/46* (2013.01); *A23P 30/20* (2016.08); *A47J 31/007* (2013.01); *A47J 31/4403* (2013.01)

(58) Field of Classification Search
CPC ...... A47J 31/46; A47J 31/4403; A47J 31/007; A23G 3/0021; A23G 3/021; A23G 3/0023; A23G 3/0247; A23G 9/26; A23G 9/28; A23G 9/285; A23P 30/20
See application file for complete search history.

(56) References Cited

U.S. PATENT DOCUMENTS 4,944,337 A * 7/1990 Credle, Jr. ................ G07F 5/18
141/174

\* cited by examiner

*Primary Examiner* — David P Bryant
*Assistant Examiner* — Christine Pellazar Bersabal
(74) *Attorney, Agent, or Firm* — Birch, Stewart, Kolasch & Birch, LLP

(57) ABSTRACT

A nozzle-moving device has four bases, two rails, a shaft, a moving module, a brewing module, a transverse driver, and a longitudinal driver. Each one of the two rails is longitudinally connected to two of the four bases. The shaft is transversely connected to two of the four bases. The moving module is slidably mounted to the two rails. The brewing module is slidably mounted to the moving module. The transverse driver and the longitudinal driver are respectively connected to the shaft and the brewing module via timing belts, so the brewing module may move in two directions. Moreover, a user may easily change to different brewing modes via the transverse driver, the longitudinal driver, and a solenoid valve connected to the brewing module.

17 Claims, 8 Drawing Sheets

NOZZLE-MOVING DEVICE

BACKGROUND OF THE INVENTION

1. Field of the Invention

The present invention relates to a nozzle-moving device, and more particularly to a nozzle-moving device of a coffee machine that is able to brew multiple cups of coffee simultaneously.

2. Description of Related Art

Coffee is a popular drink nowadays, and the market for coffee is still growing. Plenty of coffeehouses or cafés are opened and serve coffee with different flavors.

Two main ways for brewing coffee are by hand and by a conventional coffee machine. Handmade coffee releases more unique flavors of coffee beans than coffee made by a machine; yet low efficiency of the brewing process and unstable quality of the handmade coffee are inevitable. On the other hand, the conventional coffee machine can brew coffee at a high speed along with good quality, which is attractive to consumers having a fast-paced lifestyle.

However, the conventional coffee machine has the following shortcomings.

1. The conventional coffee machine can brew only one cup of coffee each time. Time of breaks among brews is wasted.

2. The conventional coffee machine brews every cup of coffee with the same process, so the unique flavors of each respective kind of coffee beans cannot be released.

SUMMARY OF THE INVENTION

The main objective of the present invention is to provide a nozzle-moving device of a coffee machine, which enables a nozzle of a coffee machine to move in two directions. Therefore, a user can brew multiple cups of coffee simultaneously with the coffee machine.

The nozzle-moving device comprises four bases, two longitudinal belts, two rails, a shaft, a moving module, a brewing module, a transverse driver, and a longitudinal driver. The four bases are disposed at spaced intervals. Each one of the four bases aligns with another two of the bases respectively in a longitudinal direction and a transverse direction and has a roller. Each one of the four rollers aligns with the roller of the base that is longitudinally aligned. Each one of the two longitudinal belts is connected to the two rollers of the two longitudinally aligning bases among the four bases. Each one of the two rails is connected to the two longitudinally aligning bases of the four bases, and is separated from a corresponding one of the two longitudinal belts.

The shaft is connected to the two rollers of the two transversely aligning bases among the four bases to simultaneously drive the two corresponding rollers. The moving module is slidably mounted to the two rails, and engages with the two longitudinal belts. The moving module further has a sliding rail disposed between the two rails. The brewing module having a nozzle is slidably mounted to the sliding rail of the moving module. The transverse driver is mounted to the moving module, and is connected to the sliding rail via a transverse belt. The longitudinal driver is connected to one of the two rollers that are connected to the shaft.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
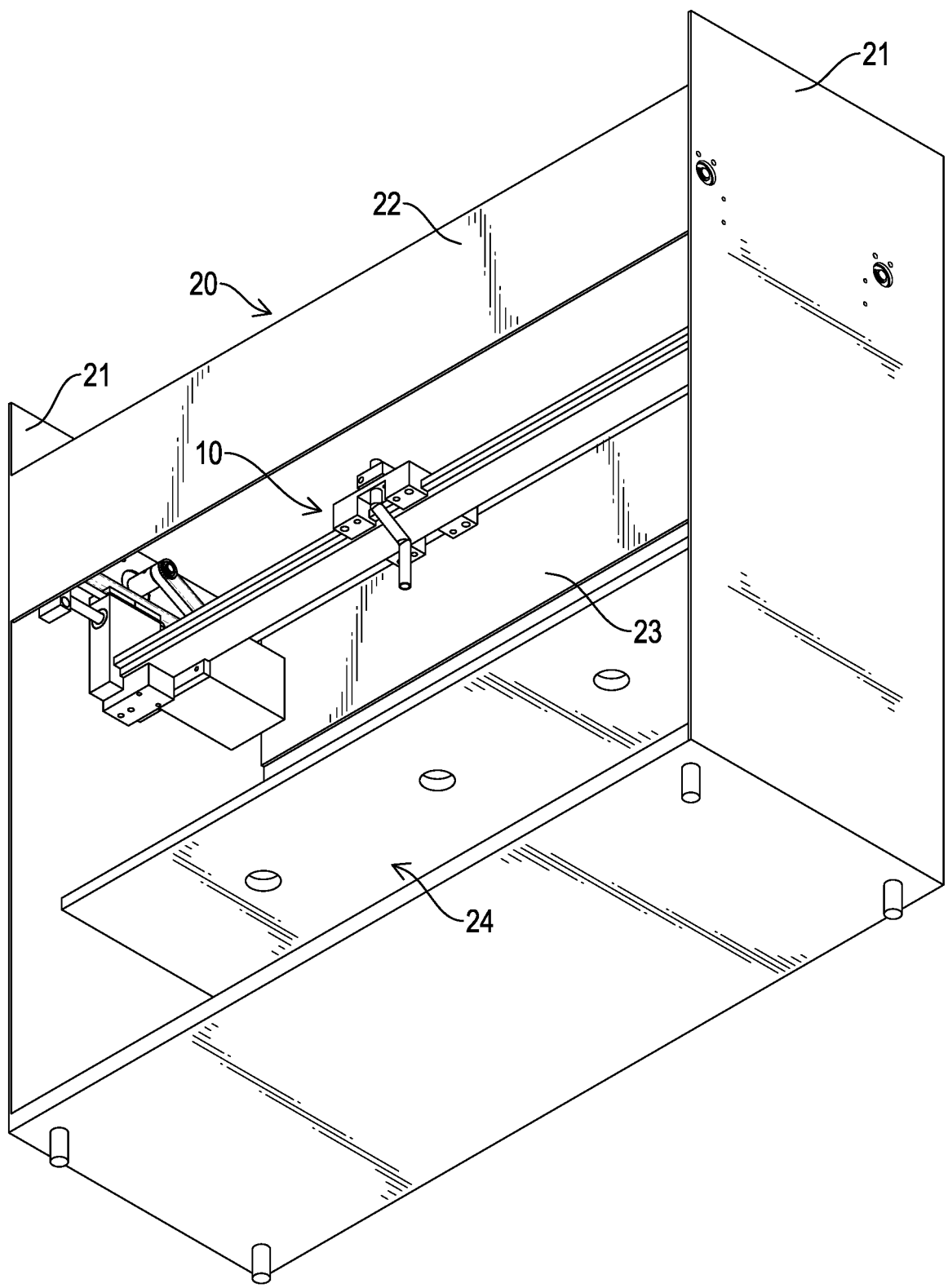
FIG. 1 is a perspective view of a nozzle-moving device in accordance with the present invention, mounted to a coffee machine.
Figure 2:
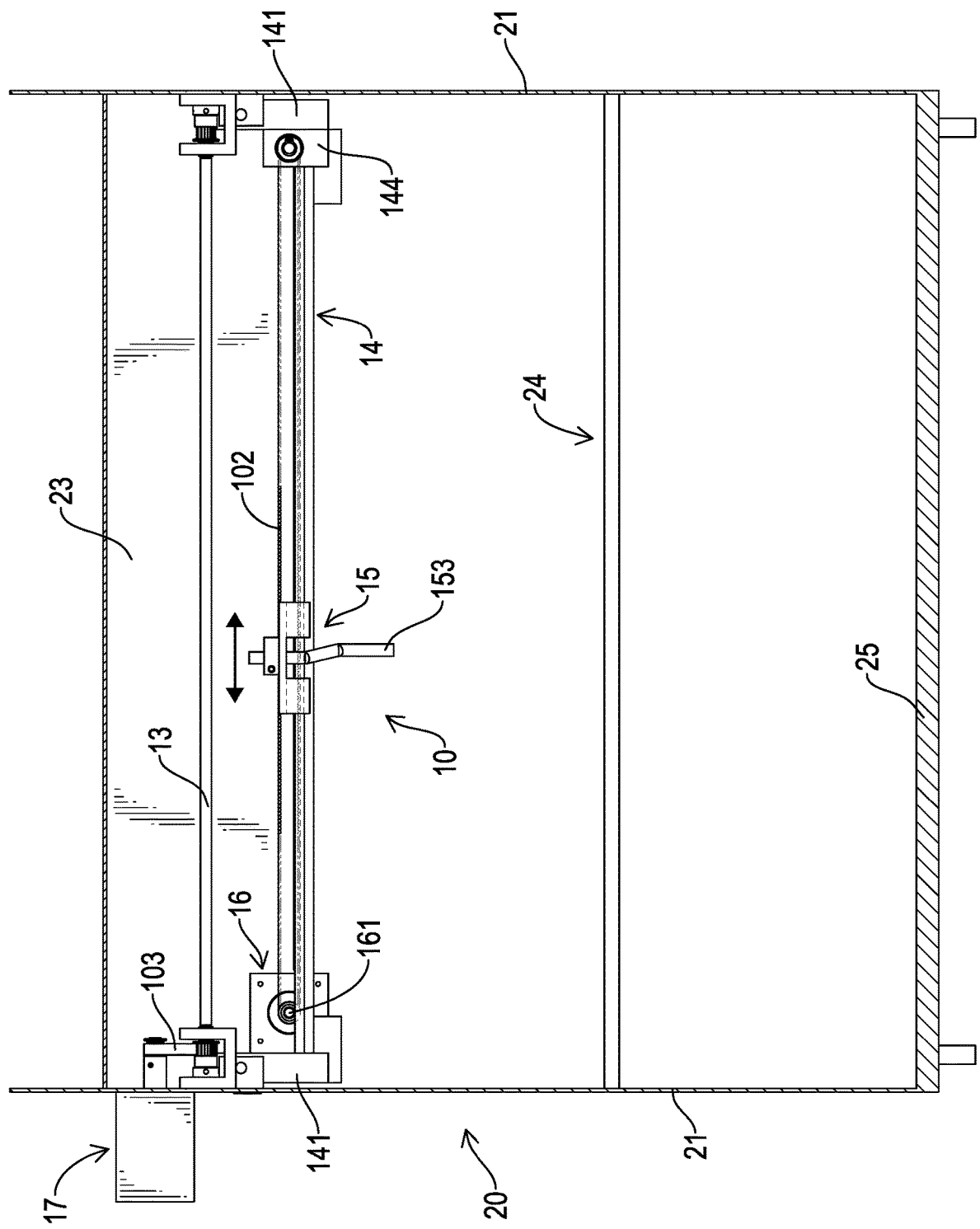
FIG. 2 is a front side view of the nozzle-moving device in FIG. 1.

With reference to FIGS. 1 and 2, a nozzle-moving device 10 is mounted on a body 20 of a coffee machine. The body 20 comprises two side boards 21, a front board 22, a back board 23, a middle shelf 24, and a bottom shelf 25. The two side boards 21 are disposed at a spaced interval in a transverse direction, aligning with each other, and each side board 21 has a top end. The front board 22 is connected to the two side boards 21 near the top ends of the two side boards 21. The back board 23 is connected to the two side boards 21 on a different side of the body 20 from the front board 22, and aligns with the front board 22 in a longitudinal direction. The middle shelf 24 is connected to the two side boards 21, and is located below the front board 22 and the back board 23. The middle shelf 24 has multiple through holes formed through the middle shelf 24 separately. The bottom shelf 25 is connected to the two side boards 21, and is located below the middle shelf 24 and at a bottom side of the body 20.

Figure 3:
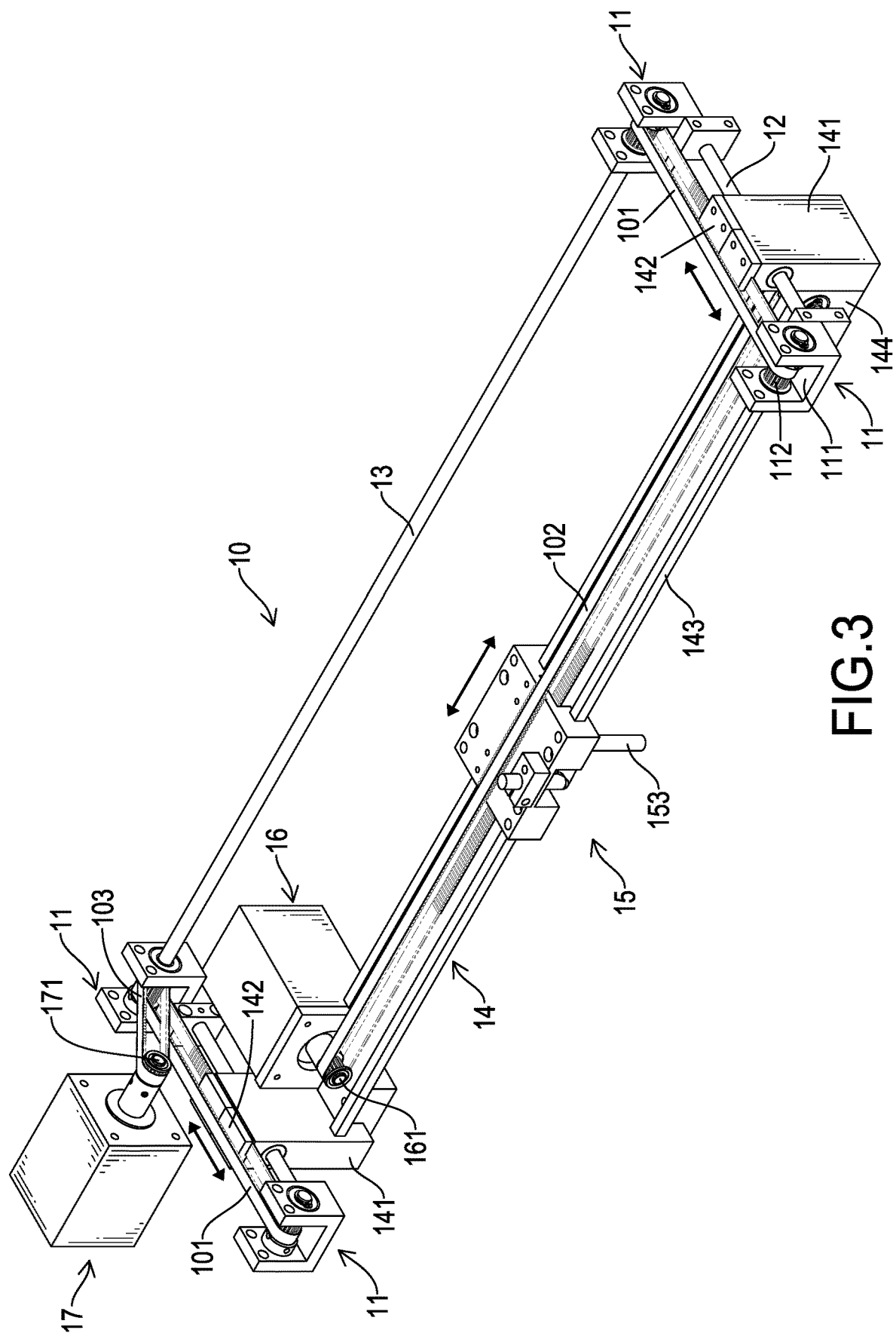
FIG. 3 is another perspective view of the nozzle-moving device in FIG. 1.

With reference to FIGS. 1 to 3, the nozzle-moving device 10 comprises four bases 11, two rails 12, a shaft 13, a moving module 14, a brewing module 15, a transverse driver 16, a longitudinal driver 17, two longitudinal belts 101, a transverse belt 102, and a driving belt 103.

Two of the four bases 11 are fixed at a spaced interval on one of the two side boards 21, and the rest of the four bases 11 are fixed to the other one of the two side boards 21. Moreover, the two bases 11 on one of the two side boards 21 align with the other two bases 11 that are on the other side board 21. That is, each one of the four bases 11 aligns with two of the rest of the bases 11, along the longitudinal direction and the transverse direction, respectively. Each base 11 has a groove 111 longitudinally formed through the base 11 and a roller 112 rotatably mounted in the groove 111. Each one of the two longitudinal belts 101 is connected to the two rollers 112 of the two longitudinally opposite bases 11, so the two rollers 112 which are on the same side board 21 may roll simultaneously.

The two rails 12 are connected to two opposite ones of the four bases 11 that are on one of the two side boards 21, and are located below the two longitudinal belts 101, respectively.

The shaft 13 is connected to the two rollers 112 of the two bases 11 which are located near the back board 23, and thus the two rollers 112 that are connected by the shaft 13 may roll simultaneously.

The moving module 14 is longitudinally movably sheathed to the two rails 12. The moving module 14 has two sliding components 141, two fixing components 142, a sliding rail 143, and a rolling component 144. The two sliding components 141 are movably sheathed to the two rails 12, respectively. Each one of the two fixing components 142 engages with a respective one of the two longitudinal belts 101, and is further fixed to a respective one of the two sliding components 141. As a result, each one of the two longitudinal belts 101 is clipped between the corresponding fixing component 142 and the corresponding sliding component 141. The sliding rail 143 is connected to the two sliding components 141 and is located between the two rails 12. The rolling component 144 is mounted to the sliding rail 143 at a location near one of the two sliding components 141, and is engaged with the transverse belt 102.

Figure 4:
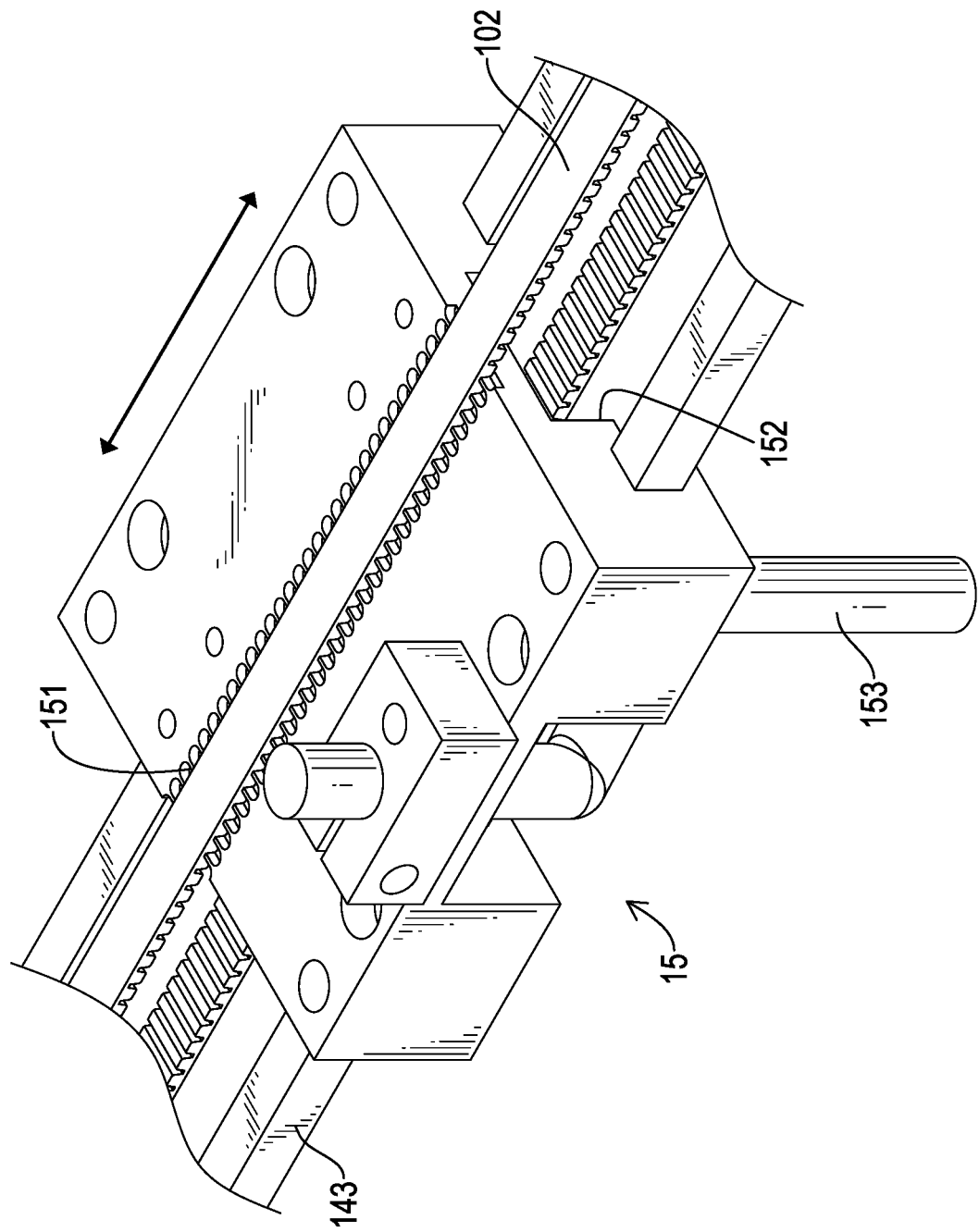
FIG. 4 is a partially enlarged perspective view of the nozzle-moving device in FIG. 1.
Figure 5:
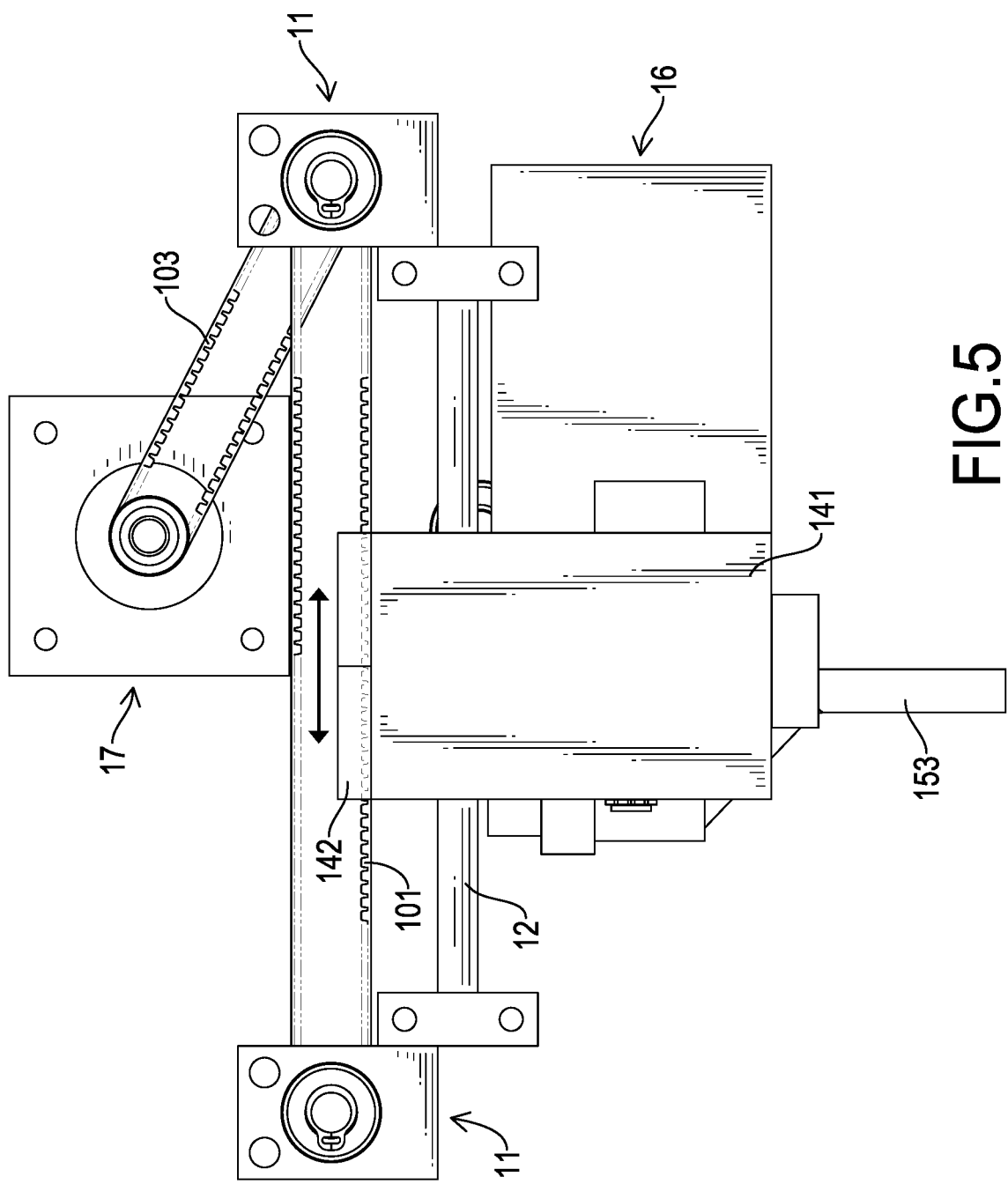
FIG. 5 is a side view of the nozzle-moving device in FIG. 1.
Figure 6:
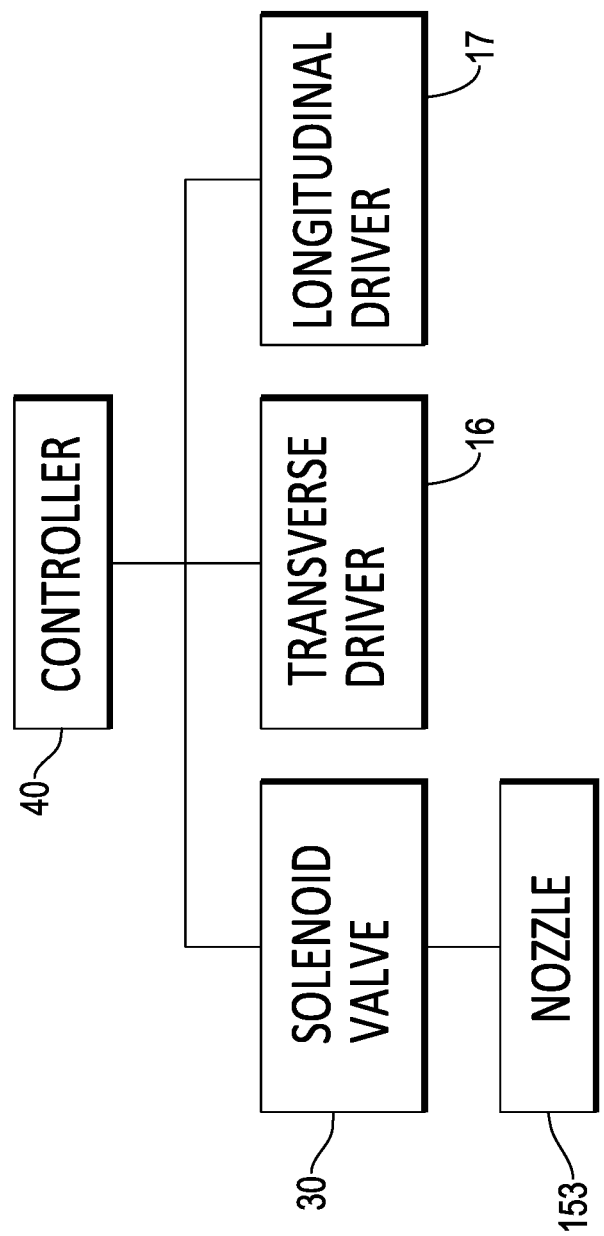
FIG. 6 is a block diagram of an operating method of the nozzle-moving device in FIG. 1.

With reference to FIGS. 3 and 4, the brewing module 15 is slidably mounted to the sliding rail 143 of the moving module 14. The brewing module 15 has a rack 151, a cavity 152, and a nozzle 153. The rack 151 is disposed on a top of the brewing module 15 along the transverse direction, and engages with the transverse belt 102. The cavity 152 is transversely formed through a bottom of the brewing module 15. The nozzle 153 is mounted on the brewing module 15 near the front board 22. With reference to FIG. 6, the nozzle 153 is connected to a solenoid valve 30 via a tube.

In the preferred embodiment of the present invention, the transverse driver 16 and the longitudinal driver 17 are each respectively a motor.

With reference to FIGS. 2, 3, 5, and 6, the transverse driver 16 is mounted on the sliding rail 143 of the moving module 14 away from the rolling component 144. The transverse driver 16 has a transverse driving roller 161. The transverse belt 102 is connected to the transverse driving roller 161 and the rolling component 144, engages with the rack 151, and passes through the cavity 152 of the brewing module 15. Consequently, as shown in FIG. 2, the transverse belt 102 may drive the brewing module 15 to move back and forth along the transverse direction, by rotating in either a clockwise or a counterclockwise direction between the transverse driver 16 and the rolling component 144.

The longitudinal driver 17 is mounted on an outer side of the side board 21 which is located near the transverse driver 16, and has a longitudinal driving roller 171 extending into an inner side of the same side board 21. The driving belt 103 is connected to and engages with the longitudinal driving roller 171 and the roller 112 that is located near the longitudinal driver 17 and the back board 23, beside the corresponding engaged longitudinal belt 101. Once the longitudinal driver 17 is actuated, the driving belt 103 will drive the shaft 13 to simultaneously rotate the two longitudinal belts 101, so the moving module 14 may slide on the two rails 12.

A user may brew multiple cups of coffee in a row by taking advantages of the brewing module 15, the transverse driver 16, and the longitudinal driver 17. With reference to FIG. 6, the solenoid valve 30 that is connected to the brewing module 15, the transverse driver 16, and the longitudinal driver 17 is electrically connected to a controller 40 and controlled by the controller 40. Thus the user may control water feed of the nozzle 153, and change a position of the brewing module 15, transversely or longitudinally.

Figure 7:
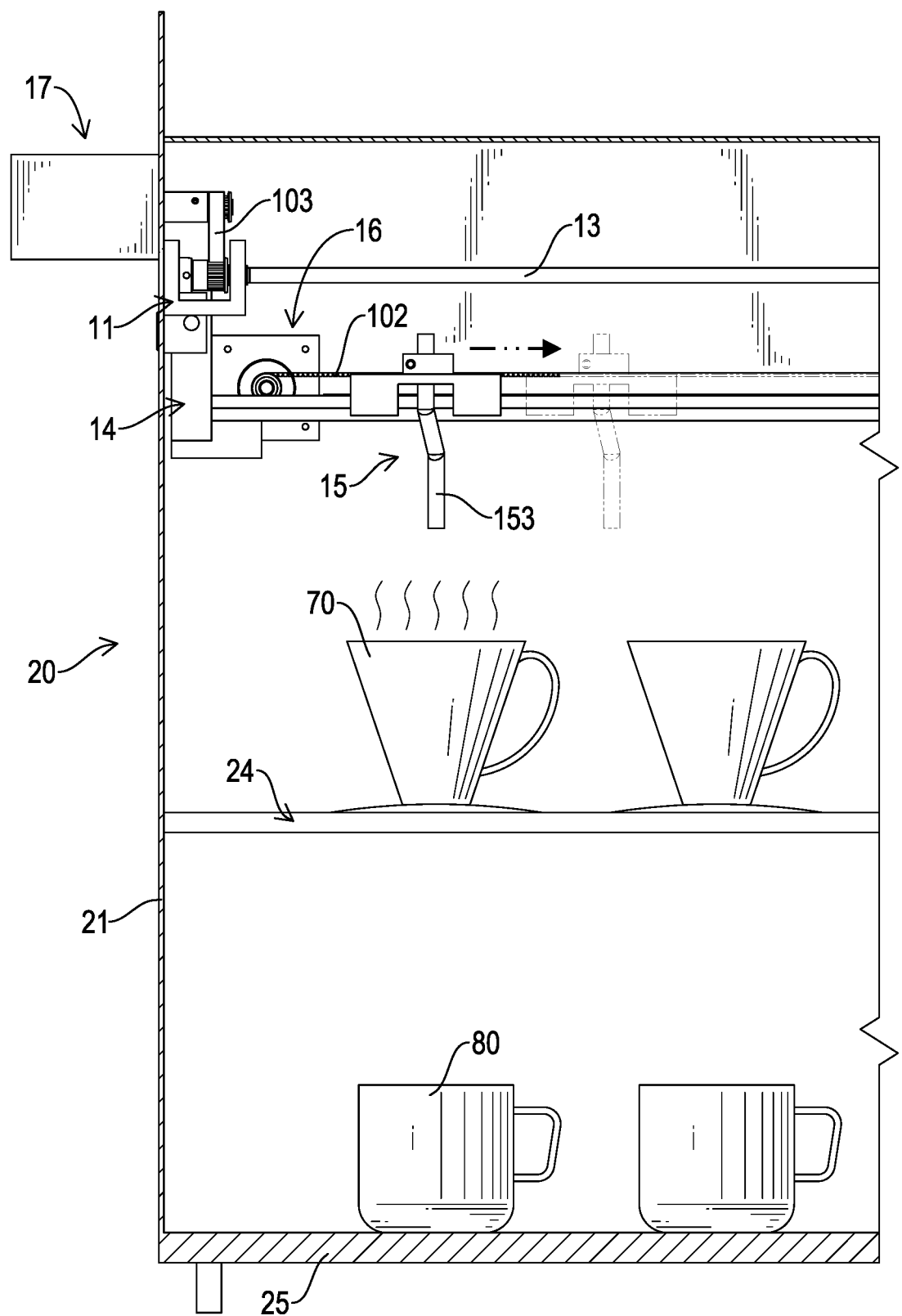
FIGS. 7 and 8 are operational side views of the nozzle-moving device in FIG. 1.
Figure 8:
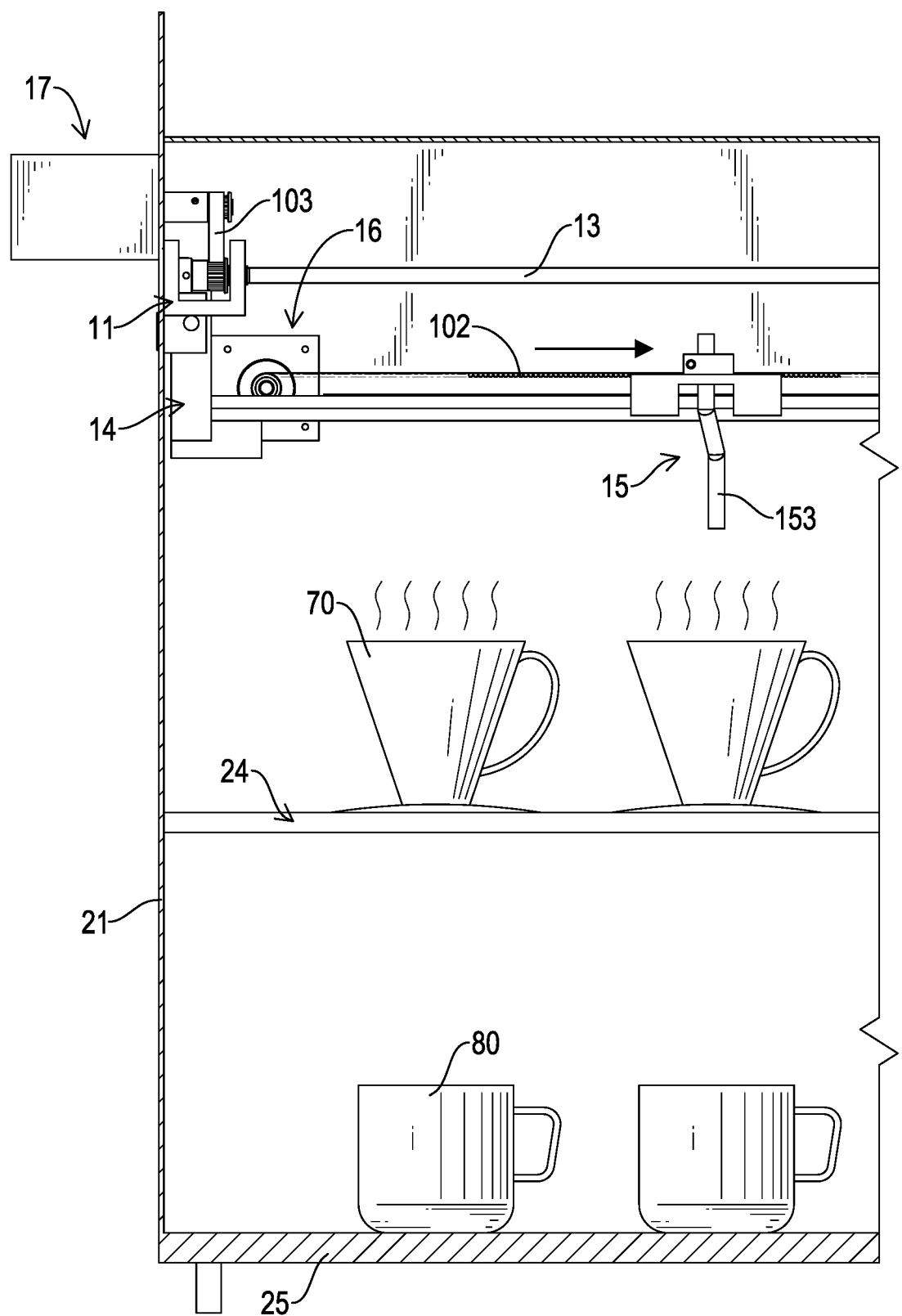

With reference to FIGS. 7 and 8, multiple filter cups 70 and multiple cups 80 are respectively put on the middle shelf 24 and the bottom shelf 25. Each one of the multiple filter cups 70 aligns with a respective one of the multiple through holes of the middle shelf 24, and further aligns with a respective one of the multiple cups 80 located below. Controlled by the controller 40, the transverse driver 16 pulls the brewing module 15 to move over the multiple filter cups 70 in order. To make different kinds of coffee, different brewing modes are required for the coffee machine to adjust brewing methods, the amount of water feed and brewing time, wherein the adjustment of water feed refers to a way in which the nozzle 153 moves.

For instance, in a brewing mode, the nozzle 153 may either move back and forth in two directions above a first one of the multiple filter cups 70 to evenly moisten coffee powder, or precisely feed in a certain amount of water by the solenoid valve 30. Therefore, the transverse driver 16, the longitudinal driver 17, and the solenoid valve 30 enable the coffee machine to use a specific brewing mode according to the kind of coffee to be brewed.

Moreover, during breaks to wait for brewing the first filter cup 70, the nozzle 153 may move to a second filter cup 70 to begin a corresponding brewing operation of the second filter cup 70, so the coffee machine may accomplish brewing operations of the multiple cups 80 of coffee with high efficiency.

In the preferred embodiment of the present invention, the two longitudinal belts 101, the transverse belt 102, and the driving belt 103 are each respectively a timing belt, and the four rollers 112, the rolling component 144, the transverse driving roller 161, and the longitudinal driving roller 171 are each respectively a timing pulley.

With the aforementioned technical features, the nozzle-moving device has the following advantages.

1. The coffee machine with the nozzle-moving device may brew multiple cups of coffee in different brewing modes.

2. Brewing operations for multiple cups of coffee may be accomplished with high efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A nozzle-moving device comprising:
four bases spaced at intervals, each one of the four bases aligning with another two of the bases respectively in a longitudinal direction and a transverse direction and having a roller;
each roller aligning with the roller of the base that is longitudinally aligned;
two longitudinal belts, each one of the two longitudinal belts connected to the two rollers of the two longitudinally aligning bases among the four bases;
two rails, each one of the two rails connected to the two longitudinally aligning bases among the four bases and separated from a corresponding one of the two longitudinal belts;
a shaft connected to the two rollers of the two transversely aligning bases among the four bases to roll the two rollers simultaneously;
a moving module slidably mounted to the two rails, engaging with the two longitudinal belts, and having a sliding rail disposed between the two rails;

a brewing module slidably mounted to the sliding rail of the moving module and having a nozzle;

a transverse driver mounted to the moving module and connected to the sliding rail via a transverse belt; and a longitudinal driver connected to one of the two rollers that are connected to the shaft.

2. The nozzle-moving device as claimed in claim 1, wherein the four rollers of the four bases are each respectively a timing pulley, and the two longitudinal belts are each respectively a timing belt that engages with the two corresponding rollers.

3. The nozzle-moving device as claimed in claim 2, wherein the longitudinal driver has a longitudinal driving roller connected to the roller that is connected to the longitudinal driver via a driving belt.

4. The nozzle-moving device as claimed in claim 3, wherein the longitudinal driving roller is a timing pulley, and the driving belt is a timing belt engaging with the longitudinal driving roller and the roller connected to the longitudinal driver.

5. The nozzle-moving device as claimed in claim 1, wherein the moving module has a rolling component mounted on the moving module away from the transverse driver; and the transverse driver has a transverse driving roller connected to the rolling component via the transverse belt.

6. The nozzle-moving device as claimed in claim 2, wherein the moving module has a rolling component mounted on the moving module away from the transverse driver; and the transverse driver has a transverse driving roller connected to the rolling component via the transverse belt.

7. The nozzle-moving device as claimed in claim 3, wherein the moving module has a rolling component mounted on the moving module away from the transverse driver; and the transverse driver has a transverse driving roller connected to the rolling component via the transverse belt.

8. The nozzle-moving device as claimed in claim 4, wherein the moving module has a rolling component mounted on the moving module away from the transverse driver; and the transverse driver has a transverse driving roller connected to the rolling component via the transverse belt.

9. The nozzle-moving device as claimed in claim 6, wherein the rolling component and the transverse driving roller are each respectively a timing pulley, and the transverse belt is a timing belt engaging with the rolling component and the transverse driving roller.

10. The nozzle-moving device as claimed in claim 7, wherein the rolling component and the transverse driving roller are each respectively a timing pulley, and the transverse belt is a timing belt engaging the rolling component and the transverse driving roller.

11. The nozzle-moving device as claimed in claim 8, wherein the rolling component and the transverse driving roller are each respectively a timing pulley, and the transverse belt is a timing belt engaging with the rolling component and the transverse driving roller.

12. The nozzle-moving device as claimed in claim 9, wherein the brewing module has a rack disposed on a top of the brewing module and engaging with the transverse belt; and a cavity transversely formed through a bottom of the brewing module for the transverse belt to pass through the cavity.

13. The nozzle-moving device as claimed in claim 10, wherein the brewing module has a rack disposed on a top of the brewing module and engaging with the transverse belt; and a cavity transversely formed through a bottom of the brewing module for the transverse belt to pass through the cavity.

14. The nozzle-moving device as claimed in claim 11, wherein the brewing module has a rack disposed on a top of the brewing module and engaging with the transverse belt; and a cavity transversely formed through a bottom of the brewing module for the transverse belt to pass through the cavity.

15. The nozzle-moving device as claimed in claim 12, wherein the moving module has two sliding components connected by the sliding rail, each one of the two sliding components slidably mounted to a respective one of the two rails; and two fixing components, each one of the two fixing components engaging with a respective one of the two longitudinal belts and fixed to a respective one of the two sliding components.

16. The nozzle-moving device as claimed in claim 13, wherein the moving module has two sliding components connected by the sliding rail, each one of the two sliding components slidably mounted to a respective one of the two rails; and two fixing components, each one of the two fixing components engaging with a respective one of the two longitudinal belts and fixed to a respective one of the two sliding components.

17. The nozzle-moving device as claimed in claim 14, wherein the moving module has two sliding components connected by the sliding rail, each one of the two sliding components slidably mounted to a respective one of the two rails; and two fixing components, each one of the two fixing components engaging with a respective one of the two longitudinal belts and fixed to a respective one of the two sliding components.

\* \* \* \* \*